(12) United States Patent
Heilemann et al.

(10) Patent No.: US 7,727,058 B2
(45) Date of Patent: Jun. 1, 2010

(54) FLAP OF A MOTOR VEHICLE VENTILATION SYSTEM

(75) Inventors: Juergen Heilemann, Wendlingen (DE); Kurt Mahninger, Kornwestheim (DE); Gerd Sommerer, Marktieuthen (DE); Gerhard Laubmann, Naila (DE)

(73) Assignee: Behr GmbH & Co. KG (DE)

( * ) Notice: Subject to any disclaimer, the term of this patent is extended or adjusted under 35 U.S.C. 154(b) by 144 days.

(21) Appl. No.: 11/720,589

(22) PCT Filed: Dec. 8, 2005

(86) PCT No.: PCT/EP2005/056617

§ 371 (c)(1), (2), (4) Date: Jul. 26, 2007

(87) PCT Pub. No.: WO2006/061423

PCT Pub. Date: Jun. 15, 2006

(65) Prior Publication Data

US 2008/0194193 A1 Aug. 14, 2008

(30) Foreign Application Priority Data

Dec. 10, 2004 (DE) .................. 10 2004 059 800

(51) Int. Cl.
*B60H 1/00* (2006.01)
(52) U.S. Cl. .................. 454/143; 454/69; 454/139; 137/897
(58) Field of Classification Search .................. 454/69, 454/121, 126, 143, 145, 146, 148, 149, 139; 137/512.15, 512.4, 897
See application file for complete search history.

(56) References Cited

U.S. PATENT DOCUMENTS

| | | | | |
|---|---|---|---|---|
| 3,895,650 A | * | 7/1975 | Cadiou | 137/875 |
| 4,267,880 A | * | 5/1981 | Jacquet | 165/41 |
| 4,534,275 A | * | 8/1985 | Hofmann | 454/152 |
| 4,577,836 A | * | 3/1986 | Guillemin | 251/356 |
| 4,908,028 A | * | 3/1990 | Colon et al. | 623/2.21 |
| 5,007,216 A | * | 4/1991 | Pearson | 52/94 |
| 6,193,600 B1 | * | 2/2001 | Ito et al. | 454/69 |
| 6,237,625 B1 | * | 5/2001 | Randolph | 137/512.15 |
| 2004/0038639 A1 | | 2/2004 | Yasuno et al. | |
| 2004/0152410 A1 | * | 8/2004 | Seki | 454/139 |

FOREIGN PATENT DOCUMENTS

| DE | 4343367 A1 | * | 6/1994 |
|---|---|---|---|
| DE | 199 34 624 A1 | | 1/2001 |

(Continued)

*Primary Examiner*—Steven B McAllister
*Assistant Examiner*—Patrick F. O'Reilly, III
(74) *Attorney, Agent, or Firm*—Marger Johnson & McCollom, P.C.

(57) ABSTRACT

The invention relates to a flap (2) of a motor vehicle ventilation system, which is disposed in a housing (1) in the mounted state and controls the air supply to the interior of the vehicle along with a second flap (4). The flap (2) according to the invention comprises a pivot axis about which the same can be pivoted. At least one portion of the flap area (2') is pivotable and/or flexible to the pivot axis or shaft (2") and/or another portion of the flap (2) juxtaposing the pivot axis.

14 Claims, 8 Drawing Sheets

FOREIGN PATENT DOCUMENTS

| | | | |
|---|---|---|---|
| EP | 296556 A1 * | 12/1988 | |
| EP | 1070611 A1 * | 1/2001 | |
| FR | 2238105 A * | 3/1975 | |
| FR | 2 591 950 A | 6/1987 | |
| JP | 1026438 A * | 10/1998 | |
| JP | 2000233628 A * | 8/2000 | |

* cited by examiner

FLAP OF A MOTOR VEHICLE VENTILATION SYSTEM

RELATED APPLICATION DATA

This application claims priority and benefit of PCT/EP2005/056617, filed Dec. 8, 2005, which claims priority from German patent application no. 102004059800.2, filed Dec. 10, 2004, the entire contents of which are hereby incorporated by reference.

BACKGROUND OF THE INVENTION

The invention relates to a flap of a motor vehicle ventilation system.

Provided in conventional motor vehicle ventilation systems upstream of a blower is a recirculating air flap and a fresh air flap which can be opened and closed by a common controller. In this arrangement the flaps are controlled such that the recirculating air flap is already closed when the fresh air flap is still not fully open, this requiring highly complicated kinematics.

On the basis of the prior art the object of the invention is to make available an improved flap. In particular, the flap is intended to simplify controlling the recirculating air flap and fresh air flap so that the kinematics between drive (actuator) and flaps is rendered relatively simple.

SUMMARY OF THE INVENTION

The invention provides a flap of a motor vehicle ventilation system which, when installed, is located in a housing and which together with a second flap controls the air supply to the interior of the vehicle, the flap comprising a pivot axis about which it is pivotable and wherein at least a portion of the flap surface is pivotable relative to the pivot axis or shaft and/or another portion juxtaposing the pivot axis. Because at least a portion of the flap is pivotable, the shaft is able to turn further and, simultaneously, the flap surface of the corresponding portion is prevented from pivoting further. Due to the flexible configuration pivoting return of the flap automatically results in return pivoting of the corresponding flap surface(s) due to the accumulation of the spring (return) force. The kinematics can be significantly simplified by a corresponding configuration in which a drive is caused to move somewhat further so as to, for example, open another flap somewhat further whilst the first flap is already closed.

Preferably the pivot axis of the flap surface is oriented parallel away from the pivot axis or shaft of the flap. A relatively small spacing from the shaft facilitates production without major disadvantages. The associated clearance, which is required to be somewhat larger for an adequate seal can be made available, for example, by an edge at the flap formed of a soft material.

Preferably two portions of the flap surface are pivotable relative to the pivot axis or shaft of the flap, the two portions of the flap surface being arranged on differing sides of the pivot axis or shaft. This permits uniform loading of the flap so that the resulting forces are relatively small.

The bending occurs preferably in a portion of the flap which is configured more flexible than the remaining portion of the flap. The added flexibility may be achieved by such design elements as grooves, perforations, film-type hinges and the like. As an alternative or in addition thereto a different, softer plastics material may be used in the flexible portion which may surround, where necessary, also the plastics material from which substantially the remaining portions of the flap, i.e. particularly the central portions of the flap surfaces are made.

In a further aspect the grooves or perforations may also be filled by flexible materials. Preferably the flap is flexible and also air-tight in the corresponding portions.

Producing the flap is preferably done by means of two-component injection molding two different plastics materials having different flexibility.

Advantageously the flap is configured as a recirculating air flap.

Also a subject matter of the invention is an intake housing in which a flap in accordance with the invention and a second flap are arranged, the second flap being configured particularly as a fresh air flap.

A further subject matter of the invention is a ventilation, heating and/or air-conditioning means, particularly for motor vehicles, comprising a flap in accordance with the invention and/or an intake housing in accordance with the invention. Preferably the ventilation, heating and/or air-conditioning means comprise at least one of the following components: heat exchanger, heater, evaporator, filter, temperature mixing flap, plenum chamber, one or more conduits and one or more control flaps for distributing the air to the outlet conduits.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

The invention will now be detailed by way of example embodiments with reference to the drawing in which.

DETAILED DESCRIPTION

Figure 1:
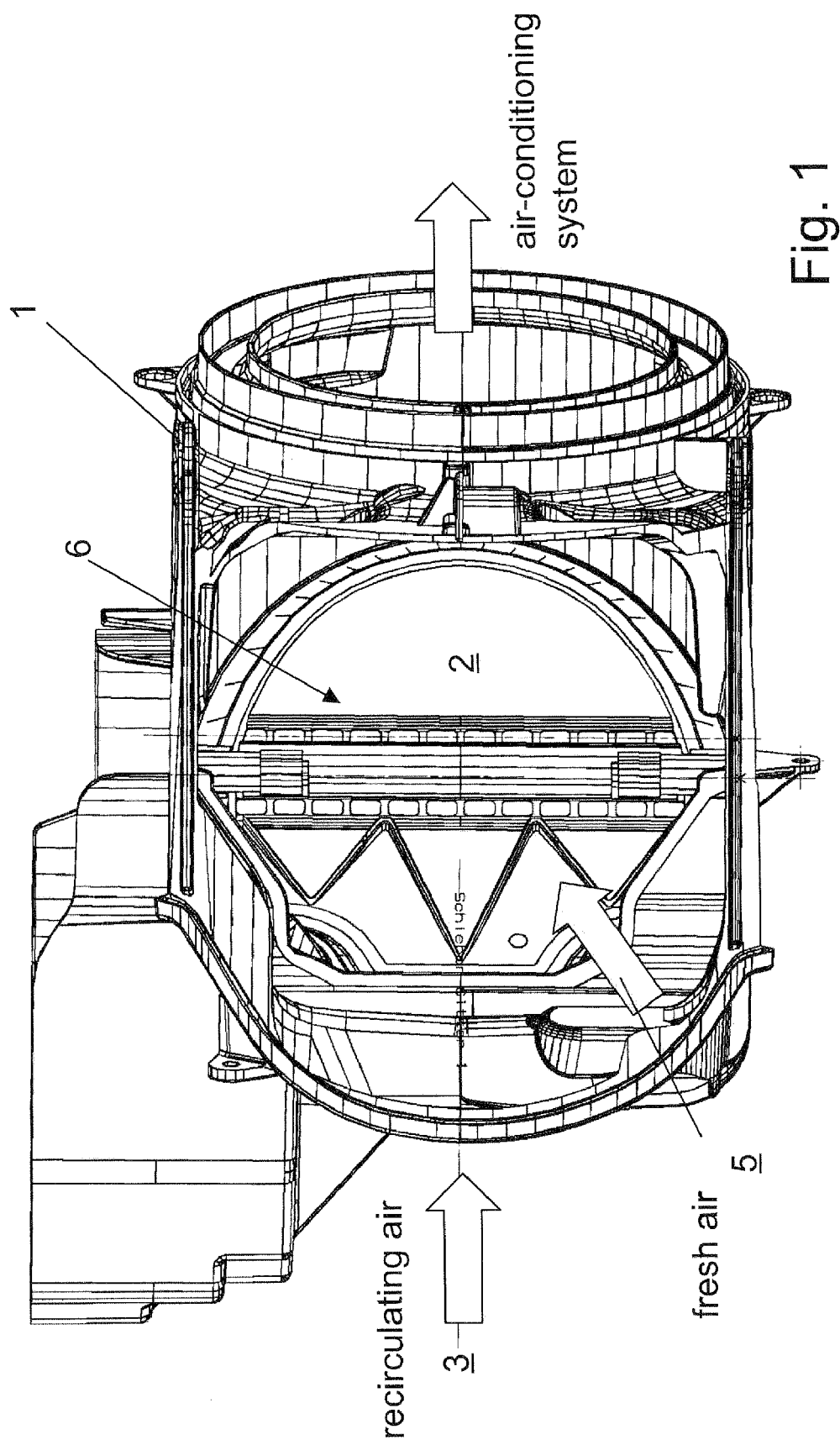
FIG. 1 is a view of an intake housing of a motor vehicle air-conditioning system with a recirculating air flap in accordance with a first example embodiment.

Provided in an intake housing 1 of a motor vehicle air-conditioning system for controlling the air supply to the vehicle interior are a recirculating air flap 2 in a recirculating air conduit 3 coming from the vehicle interior and a fresh air flap 4 in a fresh air conduit 5 coming from the exterior in the region of the merging 6 of the two conduits 3 and 5.

The fresh air flap 4 is a flap substantially already known as such, comprising a shaft 4" fixedly linked to the flap surface 4' and which together with the complete flap surface 4' is pivotable about a pivot axis. Via a lever arm 7 integrated with the shaft 4" and a linkage rod 8 pivotably linked to the lever arm 7 the shaft 4" is hinged to the drive lever 9 of a drive (not shown), whereby the connection in each case is a kind of clip fastener, i.e. involving an undercut with brief flexing on being jointed together to interconnect the two parts. In this arrangement a hinge is provided between the lever arm 7 and the linkage rod 8 and drive lever 9.

In principle, the recirculating air flap 2 is structured similar to the fresh air flap 4, i.e. is comprising a flap surface 2' and a shaft 2" fixedly linked to the flap surface 2'. The shaft 2" is hinged via a lever arm configured integrally therewith to a second linkage rod 10 and a second drive lever 11 of the drive, the two drive levers 9 and 11 being configured integrally but differingly long. The connections of the second lever arm and the second linkage rod 10 and of the second linkage rod 10 and second drive lever 11 correspond to the clip fastener as described above of the first lever arm 7 and first linkage rod as well as of the first linkage rod 8 and first drive lever 9. As regards illustrating the kinematics of the recirculating air flaps 2 and 4 reference is made to FIG. 4.

Figure 3:
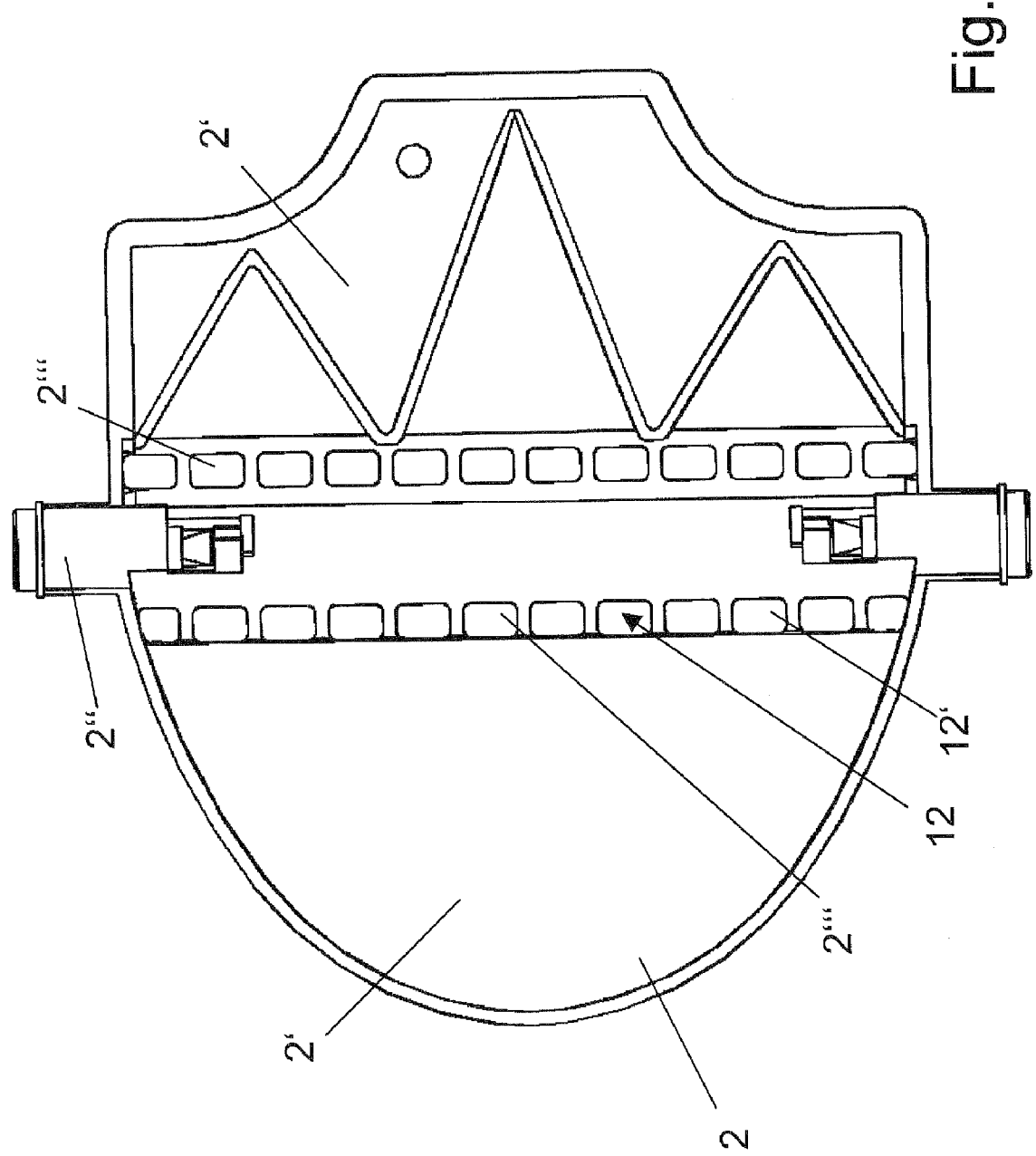
FIG. 3 is a detail view of the recirculating air flap as used in the intake housing as shown in FIG. 1.
Figure 4:
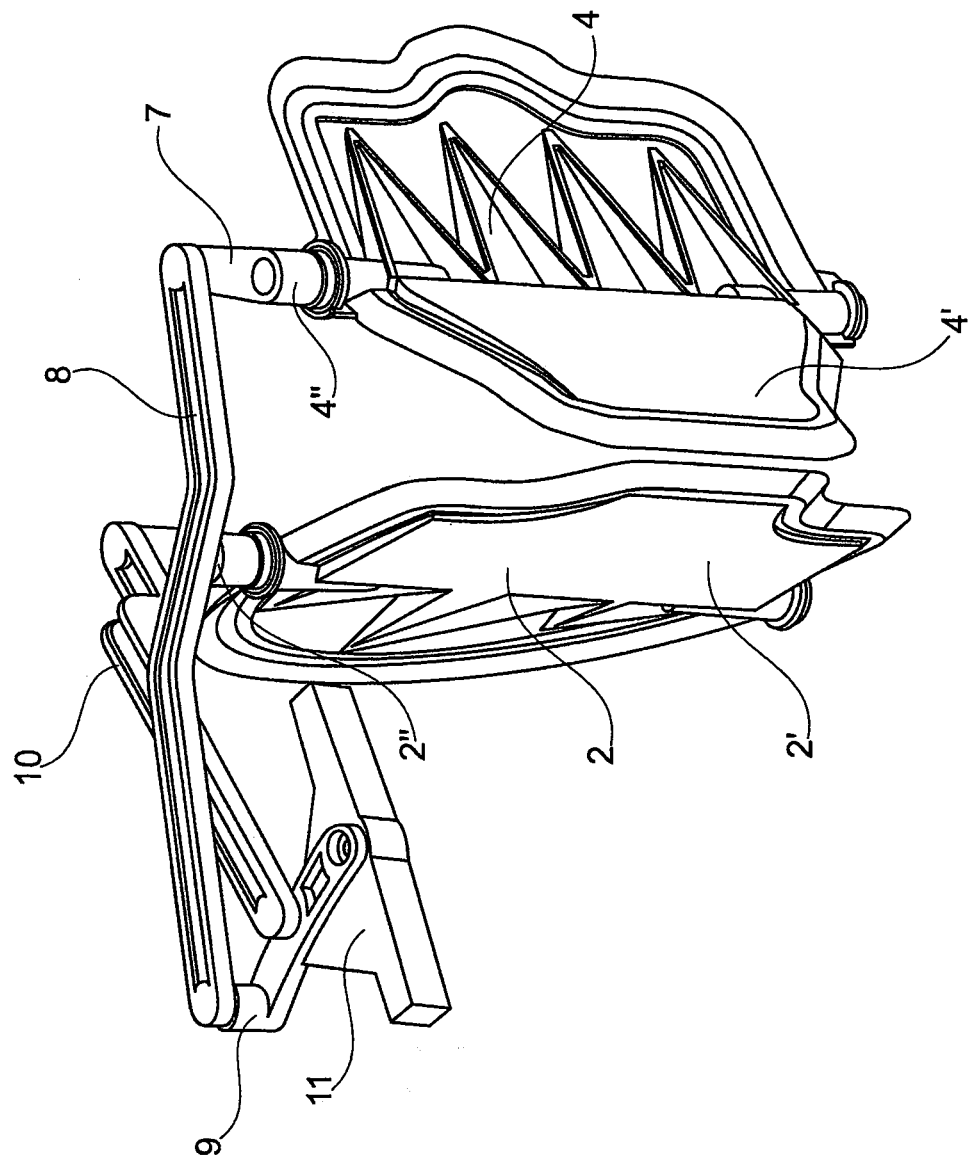
FIG. 4 is a view in perspective of the flaps and the kinematics of the intake housing as shown in FIG. 1.

To achieve the, in principle, very simple kinematics as shown in FIG. 4 substantially without special gearing translations that the recirculating air flap 2 is already closed when the fresh air flap 4 is still not fully open, i.e. with no further pivoting of the flap surface 2' of the recirculating air flap 2 with further pivoting of the flap surface 4' of the fresh air flap 4, the recirculating air flap 2 is configured such that the two flap surfaces 2' of the recirculating air flap 2 extending outwardly on both sides of the shaft 2" are flexible relative to the portion of the shaft 2" of the recirculating air flap 2. In accordance with a first example embodiment the recirculating air flap 2 is made fully of a relatively tough flexible plastics material. For pivoting of the flap surface 2' relative to the shaft 2" two flexible portions 2''' are provided on both sides of the shaft 2" to permit pivoting of the flap surface 2' relative to the shaft 2". The flexible portions 2''' run parallel to the shaft 2" and are in this case disposed equally distant from the pivot axis of the recirculating air flap 2. In accordance with the first example embodiment the flexible portions 2''' are formed in that in a groove-type portion 12 perforations 12' are provided, formed in this case by rectangular openings in an inline arrangement (cf. FIG. 3).

Figure 2:
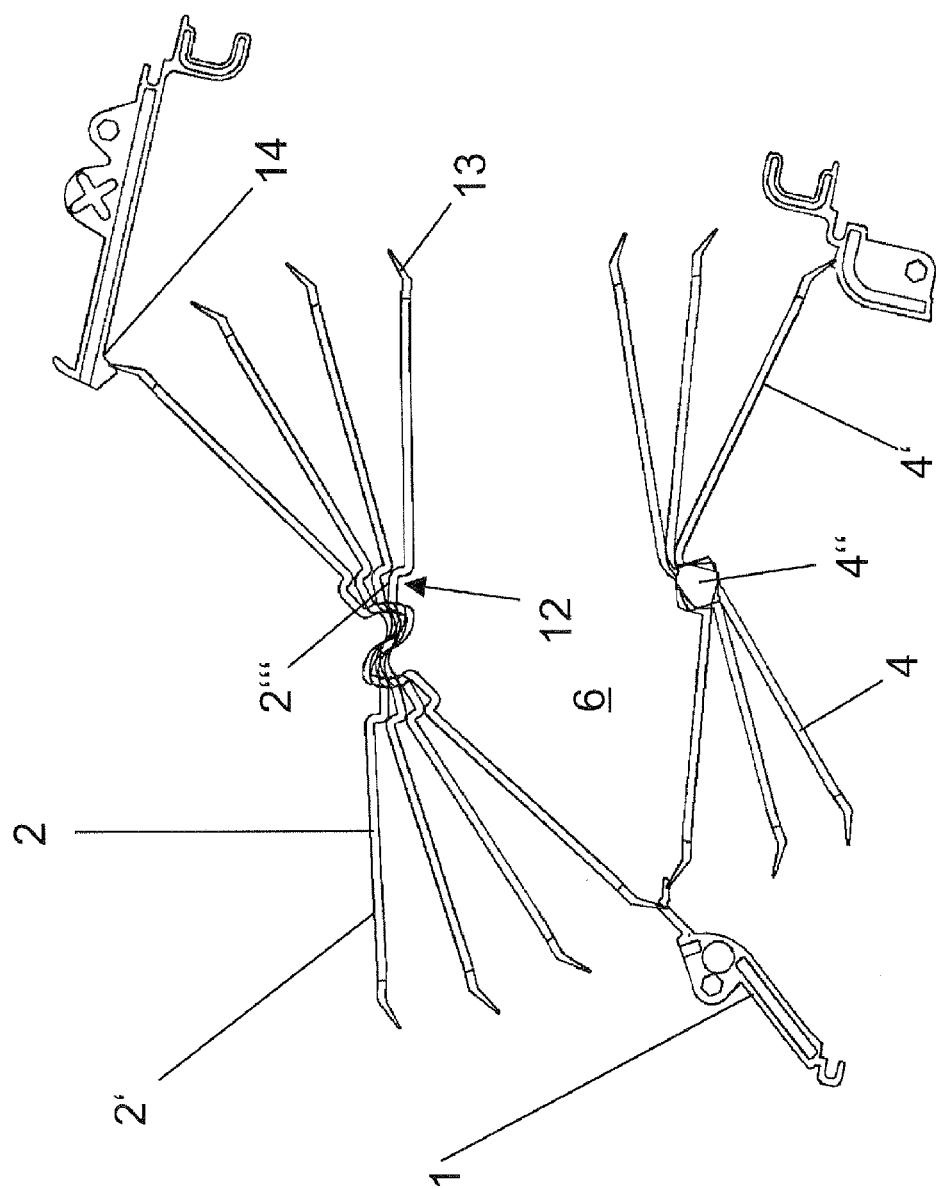
FIG. 2 is a section through the intake housing as shown in FIG. 1 showing various flap positions.

The function of the flaps 2 and 4 is as follows: the recirculating air flap 2 opens when the fresh air flap 4 closes and vice-versa, the recirculating air flap 2 being closed already before the fresh air flap 4 is fully open. Since in this arrangement the motion of the drive continues, the recirculating air flap 2 is urged against the corresponding contact surfaces 14 along the edge 13 of the flap surface 2'. Because the urging force is greater than the spring force forming in the flexible portions 2''', the flap surface 2' bend in the region of the flexible portions 2''' whilst remaining in contact with the contact surfaces 14 by their edge 13 so that the recirculating air flap 2 continues to be a tight closure. A variety of flap positions are shown in FIG. 2, but no position in which bending of the flap surfaces 2' is illustrated.

Figure 5:
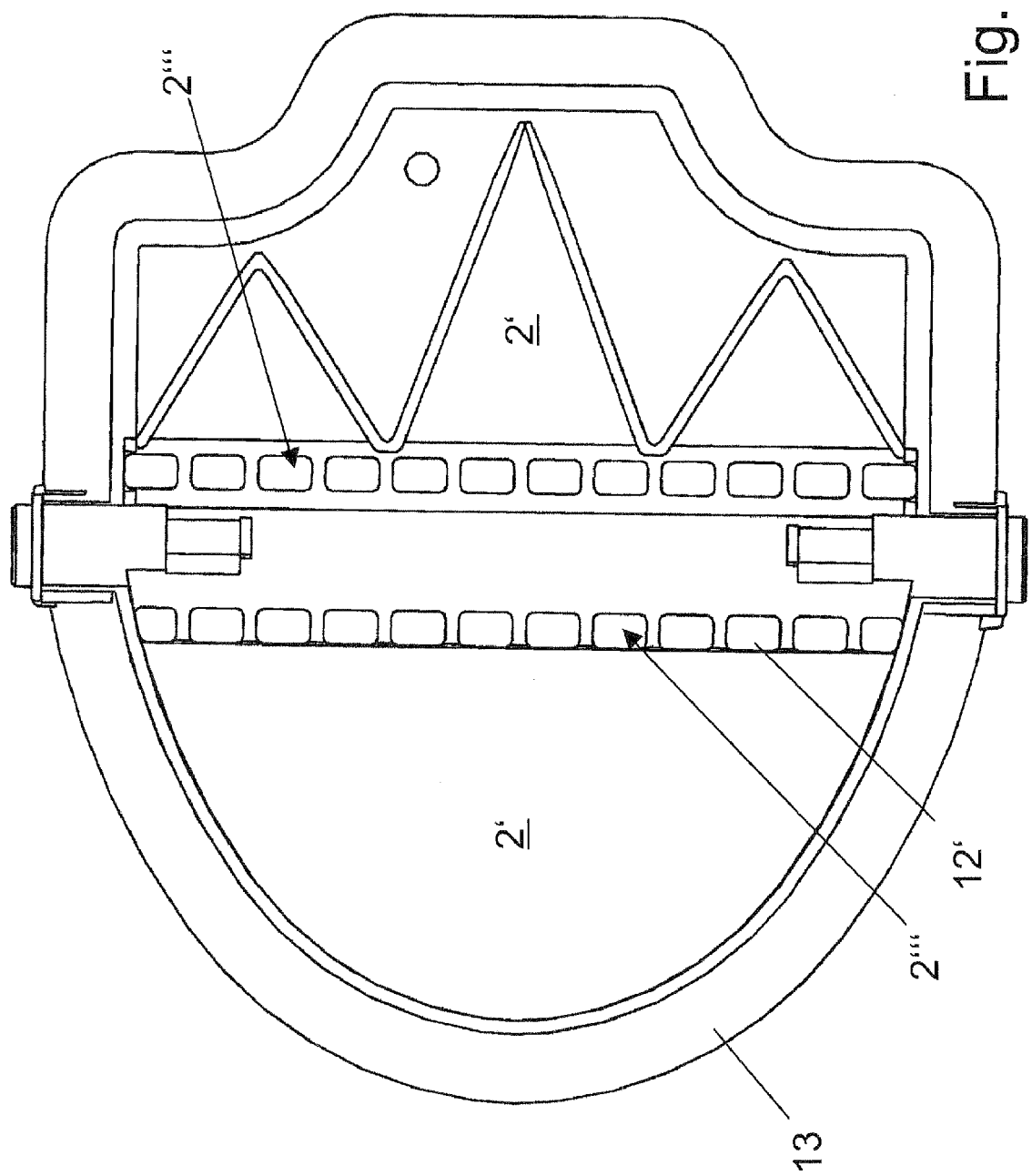
FIG. 5 is a detail view of the recirculating air flap in accordance with a second example embodiment.

Referring now to FIG. 5 there is illustrated how in the second example embodiment a softer plastics material is employed in the flexible portions 2''' of the recirculating air flap 2 than in the region of the flap surfaces 2'. Furthermore, the same softer plastics material is employed as the edge 13 to achieve optimum sealing in contact with the contact surfaces 14. Production is by means of two-component injection molding. The function is the same as that of the first example embodiment.

Figure 6:
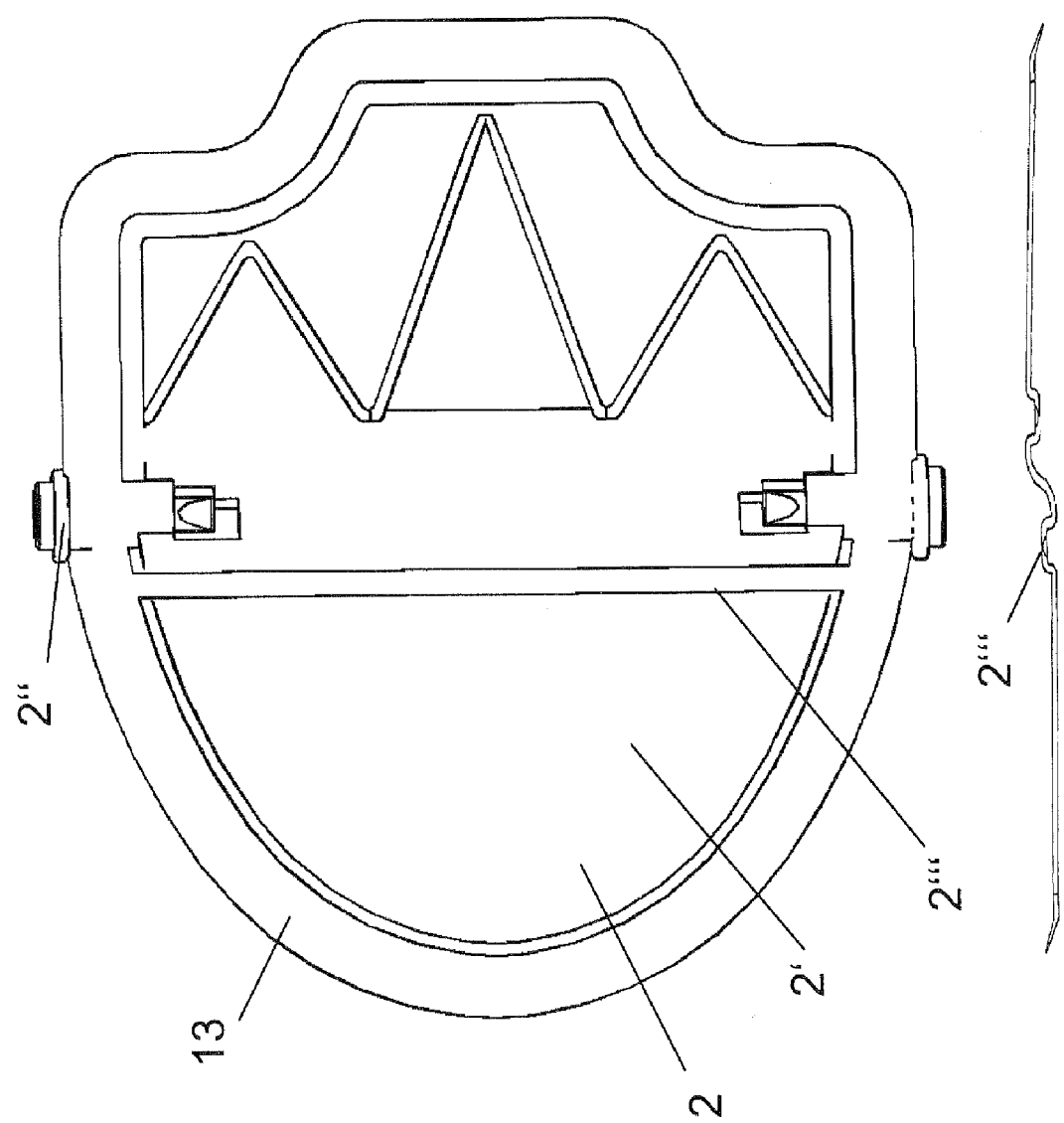
FIG. 6 is a detail view of the recirculating air flap in accordance with a third example embodiment, the lower part showing a section crosswise through the flap.

Referring now to FIG. 6 there is illustrated how in the third example embodiment the flexible portions 2''' are configured as a kind of film-type hinge, i.e. with a plurality of recesses (cf. FIG. 8), the more stable, tough basic material which is, for example, the same as in the first example embodiment, is correspondingly configured and surrounded by an injection molded softer plastics material. In addition to this, the same as in the second example embodiment, an edge 13 formed of a second, softer plastics material is provided. The function is the same as that of the first example embodiment.

Figure 7:
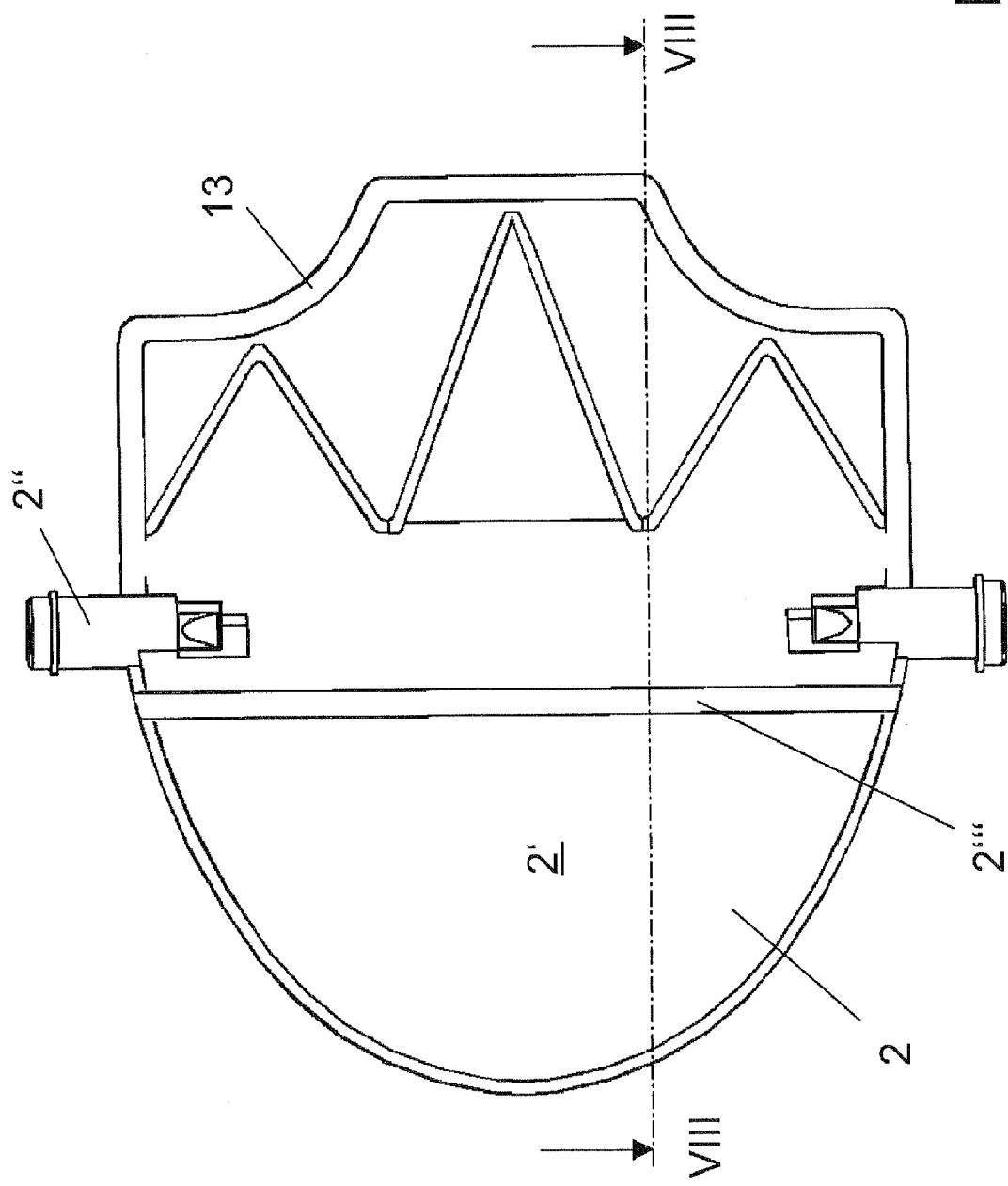
FIG. 7 is a detail view of the recirculating air flap in accordance with a fourth example embodiment.
Figure 8:
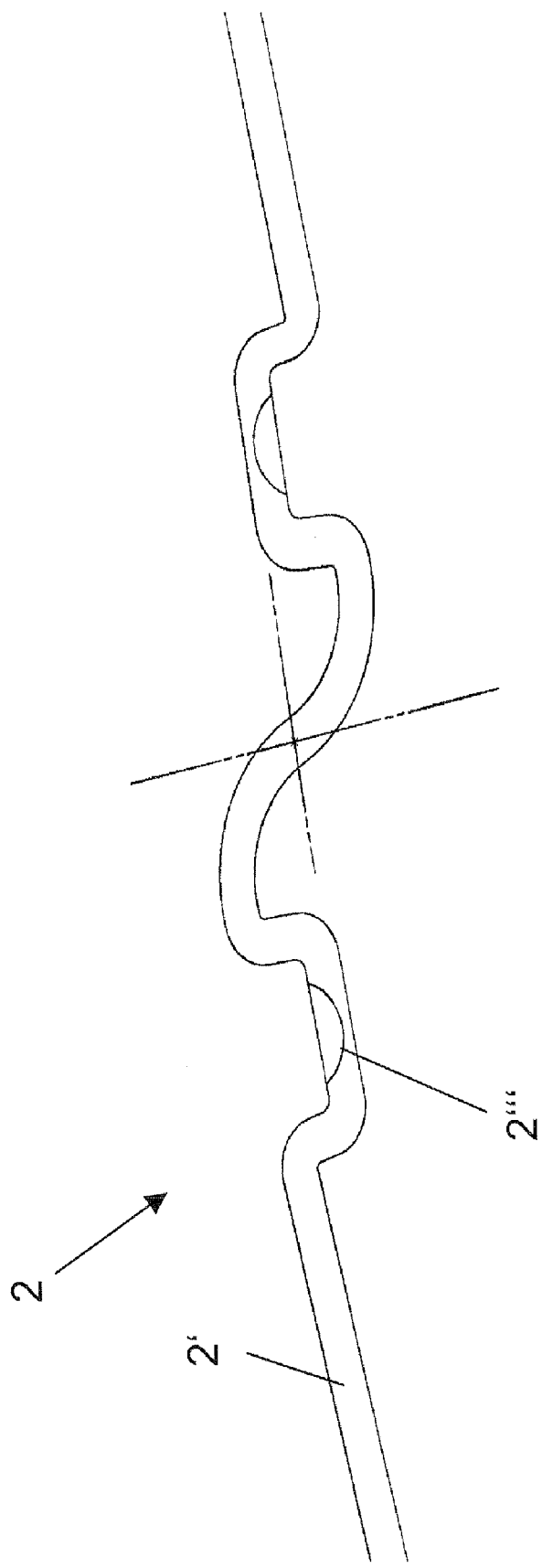
FIG. 8 is part of a section through the recirculating air flap as shown in FIG. 7 taken along the line VIII-VIII.

Referring now to FIGS. 7 and 8 there is illustrated how in the fourth example embodiment the recirculating air flap 2 is the same as that of the third example embodiment, except that the softer plastics material in the region of the flexible portions 2''' and of the edge 13 is missing. The function is the same as that of the first example embodiment.

It is to be noted that hitherto the recirculating air flap 2 and fresh air flap 4 are shown configured asymmetrical, but a symmetrical configuration is just as possible and a circular outer contour must not necessarily be provided. Furthermore, stiffeners or other additional elements, serving e.g. to direct the air flow may be provided on the flap surfaces where not detrimenting the function of flexible portions.

In accordance with a further example embodiment, not shown in the drawing, the portion jutting out from the flap and engaging the linkage rod 10 is configured such that torsion in flexure is provided, enabling the flap surface to be flexible in thus permitting pivoting relative to the pivot axis. To avoid lop-sided loading, the drive can be provided at both flap sides, i.e. two linkage rods or also a forked linkage rod may be provided.

Having described and illustrated the principles of the invention in a preferred embodiment thereof, it should be apparent that the invention can be modified in arrangement and detail without departing from such principles. We claim all modifications and variation coming within the spirit and scope of the following claims.

LIST OF REFERENCE NUMERALS

1 intake housing
2 recirculating air flap
2' flap surface
2" shaft
2''' flexible portion
3 recirculating air conduit
4 fresh air flap
4' flap surface
4" shaft
5 fresh air conduit
6 merging
7 lever arm
8 linkage rod
9 drive lever
10 second linkage rod
11 second drive lever
12 groove-like portion
12' perforation
13 edge
14 contact surface

The invention claimed is:

1. A motor vehicle ventilation system, comprising at least an intake housing, a plenum chamber, one or more flow conduits and one or more control flaps for distributing the air to the flow conduits, and a flap (2) arranged to control the air supply to the interior of the vehicle together with a second flap (4), said flap (2) comprising a shaft (2"), on which said entire flap (2) is pivotable, a flap surface (2') and a sealing portion (13), characterized in that at least a first portion of the flap surface (2') is pivotable relative to the shaft (2") and/or another portion of the flap surface on the opposite side of the shaft (2"), in that said sealing portion (13) surrounds at least a portion of the peripheral edge of said pivotable first portion of said flap surface (2'), and in that pivoting at least the first portion of the flap surface (2') relative to the shaft (2") and/or the other portion of the flap surface on the opposite side of the shaft (2") generates a return spring force, causing the flap to regain its original shape on load relief and further characterized in that pivoting occurs in a portion of the flap that is relatively proximal to the shaft (2") and/or the other portion of the flap surface on the opposite side of the shaft (2"), which is configured more flexible than the remaining portion of the flap that is relatively distal from the shaft (2") and/or the other portion of the flap surface on the opposite side of the shaft (2"), and wherein the return spring force is formed in the portion of the flap (2) that is configured more flexible than the remaining portion of the flap (2).

2. The motor vehicle ventilation system as set forth in claim 1, characterized in that the pivot axis of the flap surface (2') is oriented parallel away from the shaft (2") of the flap.

3. The motor vehicle ventilation system as set forth in claim 1, characterized in that two portions of the flap surface (2') are pivotable relative to the shaft (2") of the flap, the two portions of the flap surface (2') being arranged on differing sides of the shaft (2").

4. The motor vehicle ventilation system as set forth in claim 1, characterized in that the flexible portion (2''') is formed by a perforation (12').

5. The motor vehicle ventilation system as set forth in claim 1, characterized in that the flexible portion (2''') is formed by a kind of film-type hinge.

6. The motor vehicle ventilation system as set forth in claim 1, characterized in that the flexible portion (2''') is formed by a softer, more flexible material than the substantially remaining portion of the flap surfaces (2').

7. The motor vehicle ventilation system as set forth in claim 1, characterized in that the flexible portion (2''') comprises a softer, more flexible material surrounding the material substantially forming the flap surfaces (2').

8. The motor vehicle ventilation system as set forth in claim 1, characterized in that the flap surfaces (2') are surrounded by a flexible edge (13).

9. The motor vehicle ventilation system as set forth in claim 1, characterized in that the flap (2) is produced by two-component injection molding from two different plastics materials having differing flexibility.

10. The motor vehicle ventilation system as set forth in claim 1, wherein the flap (2) is a recirculating air flap.

11. The motor vehicle ventilation system as set forth in claim 10, characterized in that the second flap is configured as a fresh air flap (4).

12. The motor vehicle ventilation system as set forth in claim 11, characterized in that the motor vehicle ventilation system comprises at least one of the following components: heat exchanger, heater, evaporator, filter, and temperature mixing flap.

13. The motor vehicle ventilation system as set forth in claim 11, characterized in that the recirculating air flap (2) and the fresh air flap (4) are coupled together such that the recirculating air flap (2) opens a recirculating air conduit (3) within the intake housing when the fresh air flap (4) closes a fresh air conduit (5) and such that the recirculating air flap (2) closes the recirculating air conduit (3) before the fresh air flap (4) fully opens the fresh air conduit (5).

14. The motor vehicle ventilation system as set forth in claim 1, characterized in that the motor vehicle ventilation system comprises at least one of the following components: heat exchanger, heater, evaporator, filter, and a temperature mixing flap.

* * * * *